July 15, 1930.  T. BRENNAN  1,770,641
SEEDING MACHINE
Filed March 19, 1928
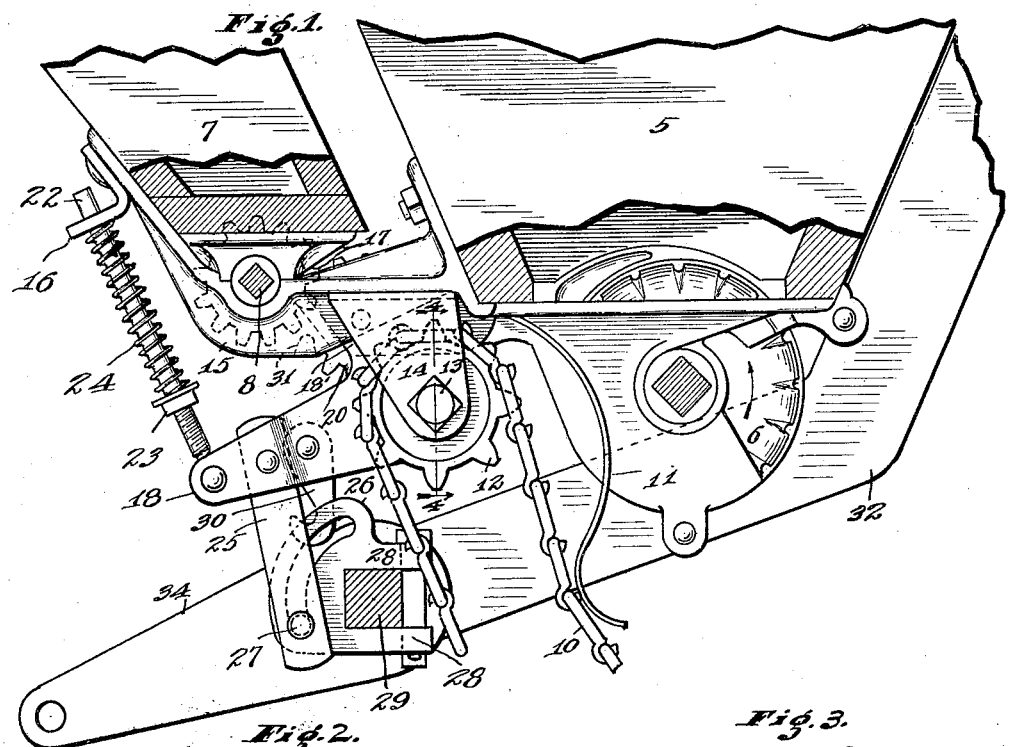
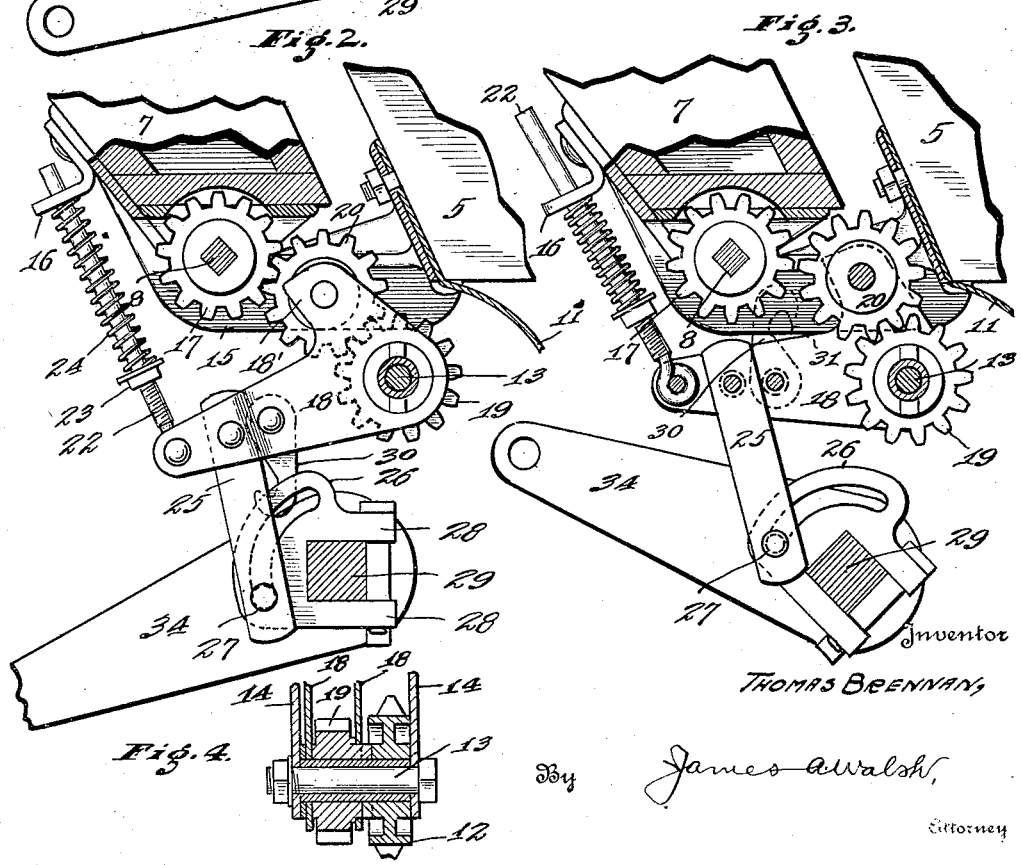
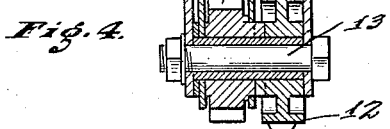
Inventor
THOMAS BRENNAN,
By James A. Walsh,
Attorney Patented July 15, 1930

1,770,641

UNITED STATES PATENT OFFICE

THOMAS BRENNAN, OF RACINE, WISCONSIN, ASSIGNOR TO J. I. CASE COMPANY, OF RACINE, WISCONSIN, A CORPORATION

SEEDING MACHINE

Application filed March 19, 1928. Serial No. 262,657.

In the use of seeding machines designed to sow grain such as wheat, barley, oats and the like, wherein feeding devices of suitable size for such purpose are employed, it is also desirable to sow grass seed which, being very small, is contained in and distributed from a supplemental hopper equipped with appropriate dispensing or feeding devices, such hopper being preferably supported by the grain hopper and the feeding devices thereof operated by the actuating mechanisms present in the machine. My improvement is applicable to a grass seeding attachment, and particularly to the means for controlling the feeding mechanisms so that they may be readily adjusted to operative or inoperative condition as required, either manually or by devices forming part of the general seeding machine, and it may be employed also with other types of machines or apparatus requiring the action which I accomplish. In the manufacture of seeding machines it is common practice to provide as a unit a combined grain seeder and grass seeder, as certain important details of construction of both structures are permanently connected and interdependent, so that it becomes necessary to purchase such a combination machine for the purpose described under present practice, but by my improved grass seeder actuating devices, constructed and operating in the manner disclosed, I am enabled to supply such grass seeder independently for a standard seeding machine so that the user of the latter may readily attach the grass seeder thereto.

In the accompanying drawing, forming part hereof, Figure 1 is an end elevation of an ordinary seeding hopper and a grass seeder equipped with my improvement; Fig. 2, a detail showing the driving gears in engagement and the seeder in position for dispensing seed; Fig. 3, a detail showing the gearing disengaged; and Fig. 4 is a transverse detail section showing the sprocket and driving gear employed.

In said drawing, the numeral 5 indicates a seeding machine hopper of any desired character equipped with feed-runs or dispensers, as 6, commonly employed in such machines. To the hopper 5, preferably at the front end thereof, I secure a grass seed hopper, 7, equipped with feed runs (not shown) mounted on a drive-shaft, 8, in a well known manner. My invention relates especially to mechanism for actuating such feed-runs and discontinuing the operation thereof as conditions require during the operation of the seeding machine whereby these results may be accomplished mechanically by a lever or by hand.

To the ordinary driving axle (not shown) I connect a chain, 10, controlled by a belt guide, 11, which chain passes about and rotates a sprocket, 12, mounted upon a pin or bolt, 13, in brackets, 14, which are connected, one at each side, to a drive-shaft support, 15, secured to the machine hopper 5, and also to the inclined wall of the hopper 7, at which latter point a perforated ear, 16, is also secured. In the shaft support 15 I mount the shaft 8, which is provided with a gear, 17, seated between the side members of the support, and upon the pin 13, and within the walls of the bracket 14, I provide a gear throw-out, 18, comprising separate members which straddle a gear, 19, also mounted on pin 13 adjacent the sprocket 12, these members having extensions, 18', constituting a support for gear, 20, which latter is adapted to be engaged with and disengaged from gear 17. To the outer end of the members of the throw-out 18 I secure a rod, 22, having a stop, 23, between which and the ear 16 is a tension spring, 24, the rod extending through said ear. A link, 25, is pivoted between the throw-out members, and at its lower end is provided with a slotted quadrant, 26, secured to the link by a pin, 27, the quadrant terminating in yoke members, 28, which receive the square roll-shaft, 29, common to seeding machines. The throw-out 18 is provided with a hook or latch, 30, adapted to be hooked about a catch, 31, on the shaft support 15, for a purpose to appear. The shaft 29 is rocked by a lever, 32, connected thereto and extending to within convenient reach of an operator, and said shaft, as will be understood, carries arms, 34, connected to the disks (not shown) of a seeding machine whereby the latter may be raised and lowered from the soil by manipulating said lever.

In Figs. 1 and 2 the gears are shown as engaged so that the driving action of chain 10 will transmit rotary motion through the gears to the shaft 8, which in turn rotates to actuate the feed-runs, and it will be seen that the rod 22, shaft 29, and associated parts are in normal position. However, when occasion demands that the distribution of grass seed from hopper 7 must cease, it is but necessary to rock the shaft 29 to the position shown in Fig. 3 by manipulating lever 32, whereupon the link 25 connecting the quadrant 26 and throw-out 18 will be raised by the rolling action of the shaft and thus push the pivotally mounted throw-out upwardly so that gear 20 supported by the extension 18' thereof will disengage said gear from the gear 17 on drive-shaft 8, when the latter and the devices mounted thereon will cease to operate and thus prevent distribution of the seed. During the movements recited the rod 22 will be caused to assume the position shown in Fig. 3 and compress the spring. When the lever 32 is being reversed to rock the shaft 29 to normal position the expanding action of spring 24 will impel the gear throw-out 18 and link 25 to the operative position indicated in Figs. 1 and 2, when gear 20 will be again brought into mesh with gear 17, whereby the drive-shaft 8 will be actuated to operate the devices mounted thereon. When shaft 29 is actuated by lever 32 the arms 34 and parts connected thereto will be caused to move vertically so that when said arms are in the position shown in Fig. 2 the gears 20 and 17 will be in engagement, and when the arms are in raised position as shown in Fig. 3 the gears will be disengaged to prevent rotation of shaft 8 and therefore the distribution of seed, while at the same time the parts attached to the arms have been removed from the soil. In circumstances where it is not desired to distribute seed the throw-out 18 may be lifted by hand and retained in raised position by securing the latch 30 to catch 31 so that gears 20 and 17 will be disengaged as shown in Fig. 3, when shaft 8 will remain inoperative. In the latter condition, when shaft 29 is rocked for manipulating arms 34 and connected parts the slotted quadrant 26 by its connection 27 with link 25 will freely travel in the direction of movement of roll-shaft 29 without disturbing the position of said link; and when it is desired to arrange the mechanism to again perform seeding operations it is but necessary to release latch 30 when tension-rod 22 will automatically return the parts to operative position as indicated in Fig. 2.

I claim as my invention:

1. In a gear throw-out for a grass seeder or other machine embodying a driven gear, a driving gear, an intermediate gear engaging said driven and driving gears, a throw-out for moving said intermediate gear into and out of engagement with the driven gear, a link connected to the throw-out, a quadrant to which the link is connected, and yielding means connected to the throw-out for returning the intermediate gear into engagement with the driven gear.

2. In a gear throw-out, a bracket comprising two members, a throw-out comprising two members, a gear support in the upper ends of the throw-out members, a shaft connecting said bracket and throw-out members, a driving gear on the shaft, and a sprocket on said shaft for actuating said driving gear.

3. In a gear throw-out, a bracket, a throw-out, a gear supported in the upper end of the throw-out, a shaft connecting the bracket and throw-out, a driving gear on the shaft, a sprocket on the shaft for actuating the driving gear, and means for securing the throw-out in position when adjusted to move the gear in its upper end.

In testimony whereof I affix my signature.

THOMAS BRENNAN.